United States Patent [19]
Minarovic et al.

[11] Patent Number: 5,567,914
[45] Date of Patent: Oct. 22, 1996

[54] SPLICE CLOSURE WITH ANIMAL PROTECTION

[75] Inventors: Joe T. Minarovic; Kenneth D. Rebers, both of Austin, Tex.

[73] Assignee: Minnesota Mining and Manufacturing Company, St. Paul, Minn.

[21] Appl. No.: 315,551

[22] Filed: Sep. 30, 1994

[51] Int. Cl.$^6$ ............................................... H05K 5/03
[52] U.S. Cl. .................................................... 174/93
[58] Field of Search ........................ 174/93, 92, 41, 174/70 A, 88 R, 72 R, 113 R, 120 R, 120 C; 385/102, 107, 106, 109; 427/58, 71, 212, 222; 156/49; 24/868

[56] References Cited

U.S. PATENT DOCUMENTS

| | | | |
|---|---|---|---|
| 2,981,636 | 4/1961 | Lodge et al. | 117/70 |
| 3,595,692 | 7/1971 | Gerrish | 117/218 |
| 4,171,463 | 10/1979 | Watkins | 174/120 R |
| 4,262,169 | 4/1981 | Lanton, Jr. | 174/136 |
| 4,309,072 | 1/1982 | Tweeddale | 385/102 |
| 4,505,541 | 3/1985 | Considine et al. | 385/102 |
| 4,514,035 | 4/1985 | Steinmann et al. | 174/120 R |
| 4,810,829 | 3/1989 | Rutenbeck et al. | 174/41 |
| 4,822,954 | 4/1989 | Rebers et al. | 174/93 |
| 4,874,219 | 10/1989 | Arroyo et al. | 385/107 |
| 4,938,560 | 7/1990 | Arroyo et al. | 385/107 |
| 4,946,237 | 8/1990 | Arroyo et al. | 385/107 |
| 5,322,973 | 6/1994 | Dagan | 174/92 |
| 5,426,716 | 6/1995 | Arroyo et al. | 385/100 |

OTHER PUBLICATIONS

Brochure entitled "Tests of Pocket Gophers Gnawing Electric Cables" by Walter E. Howard, Univ. of California, Davis. pp. 296–300. Journal of Wildlife Management, vol. 17, No. 3, Jul. 1953.

"Rodent Protective Sheath Is Necessary For Most Fiber Optic Cables" Lightquide Digest, 1992 Issue No. 2, pp. 1–3, by AT&T Network Systems.

"Rodent Biting Pressure and Chewing Action and Their Effects on Wire & Cable Sheath" by N. J. Cogelia et al.,. Not dated.

"An Evaluation of Some Physical Parameters Which Influence the Susceptibility of Packages to Rat Damage" by G. K. Lavoie and J. F. Glahn, Denver Wildlife Research Center, pp. 297–301. Not dated.

"Wear Testing" by Raymond G. Bayer, IBM Corporation. Not dated.

"Interdependancy of Physical Parameters of Buried Telecommuniction Cables As They Relate to Pocket Gopher Damage" by G. Keith Lavoie, U.S. Fish & Wildlife Service, Denver, Colorado. Not dated.

"Animal Chew Protection For Cables And Devices" by Roger H. Keith, ISA 1988, Paper #88–1653.1–55617–139–0/88/1823–1834/$0 + .50PP.

"Protecting Cable From Rodent Chew" by Roger H. Keith, Outside Plant, Nov./Dec. Issue 1988. #80–6104–1507–9.

3M Brochure "900 Series Variable–Sized Buried Closure" Nov. 1993, Issue 2, 34–7035–1071–8.

*Primary Examiner*—Kristine L. Kincaid
*Assistant Examiner*—Marc D. Machtinger
*Attorney, Agent, or Firm*—Gary L. Griswold; Walter N. Kirn; Jack V. Musgrove

[57] ABSTRACT

An article such as a conduit or cable, or a splice closure for a cable, is provided with improved resistance to animal damage by applying a layer of abrasive material to the article. The abrasive material is not only sufficiently hard and thick to act as a physical barrier, but its abrasive nature creates such a harsh, unpleasant grating effect that the animal tends to not attack it at all. The preferred embodiments of the article use either a plurality of granules to form the abrasive material, or a mesh substrate having an abrasive coating thereon. The material should have an effective grit value of no more than 325, and preferably no more than 100. The abrasive material may be applied using an adhesive or, where the conduit/closure is a thermoplastic polymer, various methods are provided for embedding the abrasive material in the polymeric wall.

10 Claims, 3 Drawing Sheets

SPLICE CLOSURE WITH ANIMAL PROTECTION

BACKGROUND OF THE INVENTION

1. Field of the Invention

The present invention generally relates to conduits for utilities such as pipes for natural gas, power and water distribution, as well as joints, valves and closures for the environmental protection of cables, such as those used in the telecommunications industry, whether for copper or fiber optic cable, and more particularly to novel splice closure and conduit designs having improved resistance to damage caused by certain animal pests, such as rodents and birds.

2. Description of the Prior Art

Damage from animals, particularly rodents, has plagued telephone and utility plant delivery systems since the early 50's, indeed, since the advent of conduits formed of polymers such as polyethylene (as used herein, "conduit" generally refers to pipe, duct or cable, and joints, valves and closures therefor). Squirrels, gophers, rats and mice will chew cables to grind their teeth down; closures designed for protecting drops, splices, etc., often suffer a similar fate. Gopher incisors will grow up to 12 inches per year and are thus required to be ground down for the animal's survival. These animals can exert a biting pressure exceeding 18,000 psi. Aerial closures have also been attacked by birds, particularly woodpeckers. When cables or pipes become so damaged, various deleterious effects occur. In the case of a copper communications cables, water ingress is common and typically leads to high resistance faults to the wires resulting in noise on the phone lines. Damaged pipes can rupture and leak resulting in some cases in fire, asphyxiation and explosion hazards. Animal damage seems unpredictable in its targets and extent, and utility companies have spent millions of dollars in the repair of damaged lines.

Several approaches have been devised to reduce rodent damage. One involves the design of the shape and size of the cable or closure, such as utilizing a circular cross-section with as large a diameter as possible, to prevent the animal from getting its mouth completely around the conduit, or otherwise present a larger radius of curvature to the geometry of the opposing teeth of the upper and lower jaws of the animal, so that the cutting force is more of a glancing blow. The clear disadvantage to such a requirement is the corresponding prohibition against small-diameter or irregularly-shaped conduits and closures.

Another parameter of animal resistance is the thickness of the outer wall of the conduit. While increasing the thickness is relatively simpler, it also leads to increased materials cost and increased weight of the pipe, cable or closure, without really making it any more impervious, since increased thickness neither prevents damage nor deters the animal, but rather simply makes it take longer to chew or peck through.

A third parameter recognized in the art for minimizing animal damage is the hardness of the outer surface of the conduit. Increasing the hardness generally does not, however, provide sufficient protection where the cable jacket or closure body is polymeric, since the polymers are typically selected because of their moldability or extrudability, and consequently cannot achieve sufficiently high hardness values to really prevent animal damage.

A fourth approach is to place a barrier layer around the conduit, such as a steel cylinder, guard, cover or tent structure. See, e.g., U.S. Pat. No. 4,262,169, and "Animal Chew Protection for Cables and Devices," ISA '88 Conference pp. 1823–1834. One significant drawback to this approach is the use of metal in the barrier. The presence of metal, particularly along any significant length of the conduit, may result in extensive damage associated with anodic corrosion, chemical corrosion, and lightning strikes, and utilities accordingly try to avoid the use of metal barriers. Non-metallic materials may be substituted, but they are generally less effective due to their reduced hardness. For example, the article "Protecting Cable From Rodent Chew," Outside Plant, November/December 1988, describes a fiberglass/urethane fabric which may be wrapped around the cable. While the urethane resin is somewhat resistant to impact and bending fractures, it certainly does not provide the kind of protection imparted by metallic barriers. Some authors explicitly note that nothing less than stainless steel will prevent barrier penetration, while other commentators opine that even stainless steel and other hard alloys will ultimately fail due to deformation wear. Another variation of the barrier approach is the use of a "cage" or wire screen, made of a hard metal, which prevents the rodent's teeth from reaching the outer polymeric layer of the cable/closure; see, e.g., "Pocket Gophers Gnawing Electric Cables," J. of Wildlife Management, vol. 17, no. 3, pp. 296–298. This design generally suffers from the same limitations as solid steel armor.

The barrier may alternatively take the form of an intermediate layer of the conduit, such as a metallic sheath which is usually found inside a cable's outer jacket; see, e.g., Lightguide Digest, 1992 Issue no. 2, pp. 1–3. Such a shield presents the same problems, however, associated with metallic components. Non-metallic compositions have been formulated for intermediate layers, as described in U.S. Pat. Nos. 4,874,219, 4,938,560 and 4,946,237, but these similarly lack the strength (hardness) of steel shielding. All of these barriers (metallic and non-metallic, exterior or interior) also add appreciably to the cost of the cable or closure, especially when considering that there is a very large area that must be covered on the cable/closure, and often increase the difficulty of installation. A further disadvantage in the use of cables or closures having intermediate protective layers is that, when the outer plastic layer is removed by gnawing or pecking, although the inner layer may temporarily halt animal damage, it leaves the inner layer exposed to the environment which eventually leads to the corrosion of the inner layer. This not only makes it easier for animals to subsequently inflict additional damage, but moreover may lead to a serious fault in the cable even if there is no further animal activity.

A commonality in each of the foregoing implementations is that these constructions are designed to provide physical protection (i.e., impact resistance) as opposed to deterring the animals from chewing at all. A deterrent approach is found in U.S. Pat. No. 4,309,072, which discloses the use of an outer layer having a plurality of spikes intended to discourage the animal from attacking the cable in the first place. This approach is defective, however, because its feasibility is limited to the use of spikes formed from a polymeric material and, as noted in the ISA '88 article (at page 1825), "polymer spike devices applied over cable only temporarily delay rather than halt damage to small cable such as optical fiber."

A combined protection/deterrent approach is found in U.S. Pat. No. 4,505,541, in which the cable has an inner layer of resin-impregnated inorganic fibers which, when bitten, releases needle-like projections designed to irritate the animals. This approach is also defective, however, since they can avoid getting any of the material in their mouth. As noted in the Outside Plant article, rodents have a space between the large incisors and the cheek teeth. This gap allows them to gnaw without having cuttings of the material enter their mouths, and they will not open their mouths while chewing except to get what they want and previously know as food. Moreover, the Wildlife Management article cited above notes that gophers may actually desire such filamentous materials in order to line their nests. Bitter tasting chemicals have also been applied to the conduit, but the Wildlife Management article concludes that poisons and repellents do not work against rodents because again the chemical does not get in animal's mouth. It would, therefore, be desirable to devise a method of protecting conduits, etc., against rodent chewing damage, which method not only provides a physical barrier but further provides a deterrent effect that does not rely on the animal ingesting any substance or getting some material on its coat. It would further be advantageous to devise such a method that is easily practiced, not only in the original fabrication of the article, but also in the repair of existing conduits, closures, etc., and does not require metal.

SUMMARY OF THE INVENTION

The present invention provides a conduit, closure, or other similar article relating to the physical delivery of utilities and having improved resistance to animal damage, generally comprising a conduit or closure body having a hollow inner portion, a wall, at least one entrance providing access to the inner portion, means for sealing the entrance, and an abrasive layer applied to the body wall, which layer is not only impact resistant, but further causes excessive grating or scraping with the teeth (or beak) of the animal in such a harsh, unpleasant manner that it quickly deters the animal from attacking the wall at all. The abrasive layer should have a hardness of at least 3.0 Mohs (preferably at least 5.0 Mohs), a minimum thickness of 50 microns, and preferably has a grit value of no more than 325, and most preferably no more than 100.

The abrasive layer may easily be applied to an existing article as well as during factory fabrication by coating the article with a pressure-sensitive adhesive and the pressing the abrasive material into the adhesive. The abrasive layer may also be selectively applied to different areas of the wall in varying thicknesses based on a known patterns of animal damage. In articles wherein the wall is formed of a thermoplastic, polymeric material, the abrasive material may be embedded directly in the wall. Where the body of the article is formed by a molding process, the abrasive material may be interposed between the wall and an inner surface of the mold during the molding process. With such a technique, the abrasive material may be coated with a polymer having a higher melting temperature than the melting temperature of the wall closure, to protect the inner surface of the mold from the abrasive material. This is also an example of one of many implementations where the abrasive layer is not necessarily the outermost layer of the article. The abrasive material may instead be supported on a substrate formed of a composite bonding material (CBM), and applied to the wall by fusion bonding the CBM substrate to the outer surface of the wall.

In one embodiment, the abrasive layer comprises a plurality of coarse granules affixed to said wall of said body member. As an alternative to adhesive attachment, the granules may be applied to the wall by first heating the granules to a temperature above a melting temperature of the wall and then pushing the heated granules against the outer surface of the wall. In another embodiment, the abrasive layer is formed by coating a mesh substrate with abrasive material. The mesh substrate may be attached to the wall by heating a portion of the thermoplastic material and pressing the mesh substrate against it, so that an amount of the thermoplastic material squeezes through spaces in said mesh substrate.

BRIEF DESCRIPTION OF THE DRAWINGS

The invention will best be understood by reference to the accompanying drawings, wherein.

DESCRIPTION OF THE PREFERRED EMBODIMENT

Figure 1:
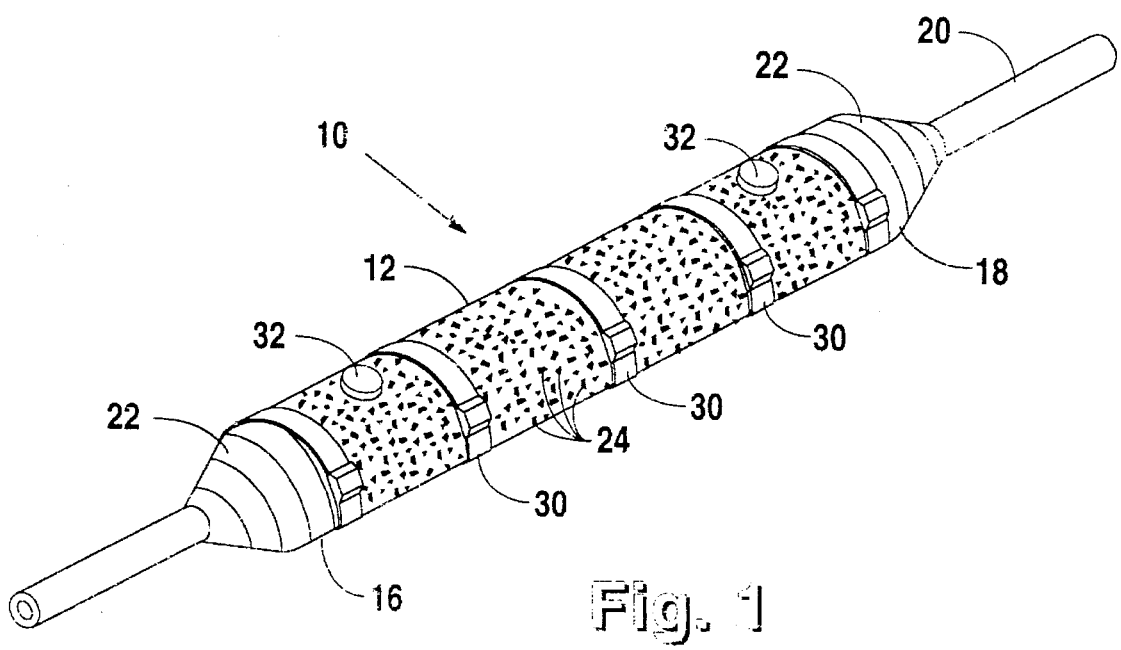
FIG. 1 is a perspective view of a buried splice closure constructed in accordance with the present invention.
Figure 2:
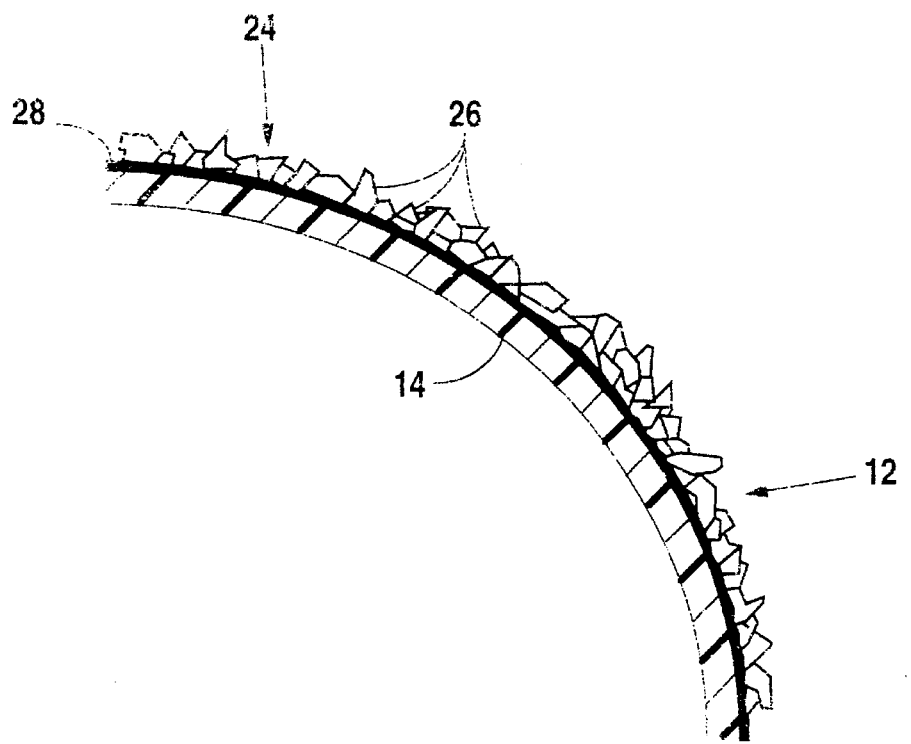
FIG. 2 is a sectional view of a portion of the wall of the buried splice closure of FIG. 1 (or of a conduit), illustrating an abrasive layer comprised of a plurality of granules.

With reference now to the figures, and in particular with reference to FIGS. 1 and 2, there is depicted one embodiment of the present invention in the form of a buried splice closure 10. Closure 10 is comprised of a generally elongate body 12 having a wall 14, first and second ends 16 and 18, and means for sealing the ends about a cable 20, each of the sealing means in this embodiment being a tape wrap 22 confining a spiral cable end seal and cone (the end seal and cone are not visible in FIG. 1); gel sealant strips (also not shown) may be employed in conjunction with the end seals. The novelty in closure 10 lies in the provision of a layer of abrasive material 24 applied to wall 14, in this case, on the outer surface of wall 14. In this exemplary embodiment, the abrasive material takes the form of a plurality of granules 26 of varying size applied to wall 14 by means of a layer of pressure-sensitive adhesive 28. The granules are preferably similar to those used for roofing shingles, such as those sold by Minnesota Mining and Manufacturing Co. of St. Paul, Minn. (3M—assignee of the present invention), and are typically trap rock (basalt), slate, argillite, greystone, greenstone or granite, but any obdurate rock material, porous or nonporous, will suffice, including feldspars, emery, chert, dolomite, limestone, marble and pegmatite (this list is not exhaustive). While the granules may be metallic, some utilities may object to the presence of any metal content as discussed above in the Background. The granules may optionally have coatings, e.g., for colors, as described in U.S. Pat. No. 2,981,636.

Wall 14 is preferably fabricated from a sheet of polymeric material, most preferably a thermoplastic polymer such as polyethylene, which is cut generally rectangular and then bowed to form a cylinder having a longitudinal opening seam. A plurality of cable ties 30 are used to secure the sheet in the cylindrical shape about the cable splice, and a gasket material (not shown) used to seal the longitudinal seam. One or more ports 32 may also be provided to allow for, e.g., the injection of sealing compound. Details of other conventional aspects of closure 10 may be found in literature pertaining to the 900 Series Buried Closure System sold by 3M.

Figure 3:
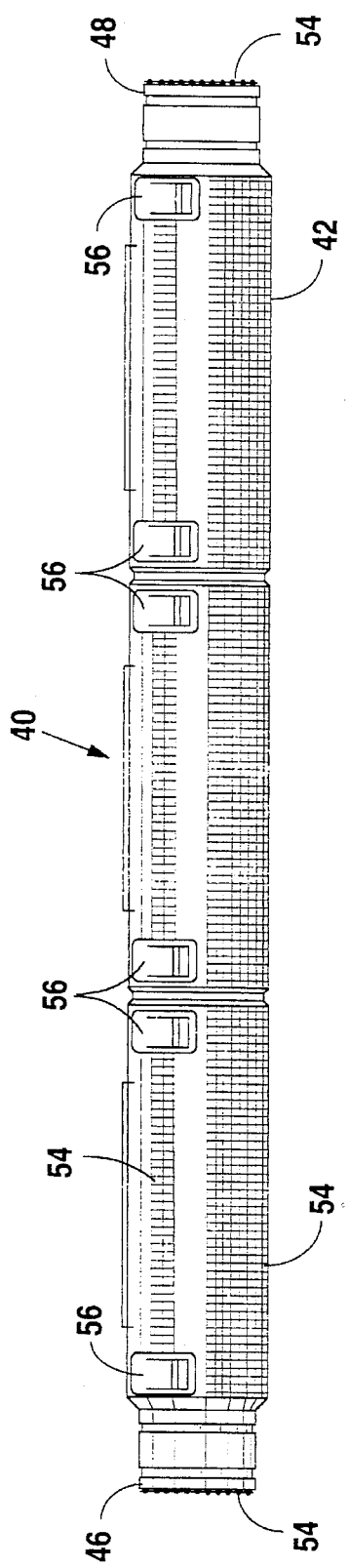
FIG. 3 is a front elevational view of an aerial splice closure constructed in accordance with the present invention.
Figure 4:
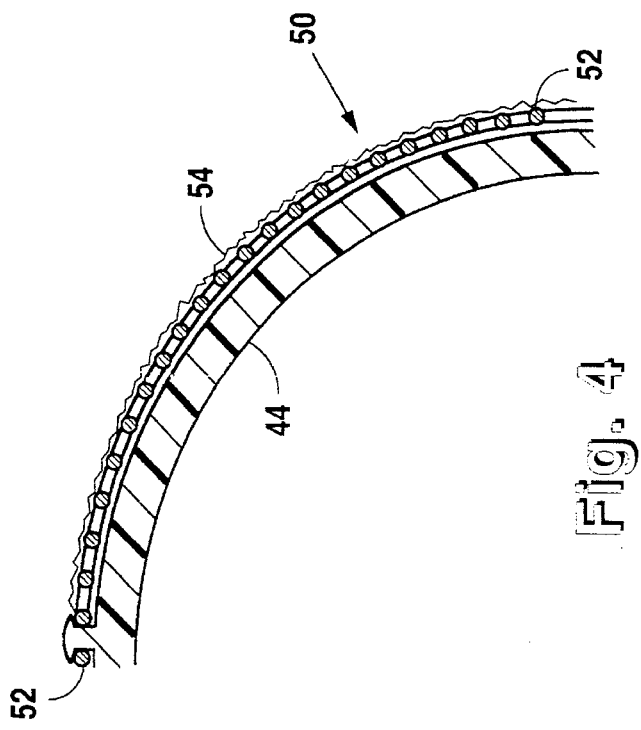
FIG. 4 is a sectional view of a portion of the wall of the aerial splice closure of FIG. 3 (or of a conduit), illustrating an abrasive layer comprised of a mesh substrate having an abrasive coating.

Referring now to FIGS. 3 and 4, another embodiment of the present invention takes the form of an aerial splice closure 40. Closure 40 is similarly comprised of a generally elongate body 42 having a wall 44, first and second ends 46 and 48, and means for sealing the ends about one or more cables, each of the sealing means in this embodiment being a molded rubber end seal adapted to fit in a bracket or flange along an inner portion of body 42 (the end seal and flange are not visible in FIG. 3). The novelty in closure 40 also lies in the provision of a layer of abrasive material 50 applied to wall 44 again on the outer surface of wall 44. In this embodiment, the abrasive layer takes the form of a mesh substrate 52 having an abrasive coating 54 thereon, such as the construction found in the Wet or Dry brand abrasive fabric sold by 3M. This fabric is formed by coating a silicon carbide (alternatively aluminum oxide) mineral onto a polyester cloth or other suitable carrier using a synthetic adhesive, and has a spacing size of about one square millimeter. The mesh should have a maximum spacing of about four square centimeters. Mesh substrate 52 may conveniently be affixed to the outer surface of wall 44 by heating a portion of the thermoplastic material and pressing the mesh substrate against it, so that an amount of the thermoplastic material squeezes through spaces in said mesh substrate, as shown by the mushroom-shaped protrusion 54 in FIG. 4. Care should be taken to tack down the edges of the mesh to keep the animal from getting its teeth under the mesh.

Body 42 is also preferably fabricated from polyethylene, using blow-molding to form a "living" longitudinal hinge and oppositely located opening seam. Blow-molding actually creates a double wall. Clasps 56 are used to secure the opening seam in its closed position. Hangers (not shown) for supporting the closure from a wire strand are also usually provided. Details of other conventional aspects of closure 40 may be found in U.S. Pat. Nos. 4,810,829 and 5,322,973. Exemplary end seals are described in U.S. Pat. Nos. 4,822, 954 and 4,857,672.

Those skilled in the art will appreciate that the drawings in FIGS. 2 and 4 could also be illustrative of conduits, such as pipes or ducts, that have similar abrasive layers.

Figure 5:
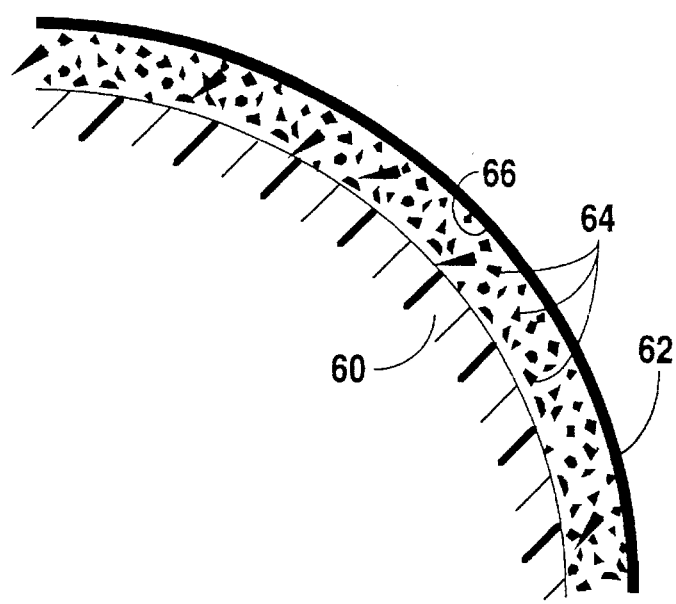
FIG. 5 is a sectional view depicting a molding process according to the present invention.
Figure 6:
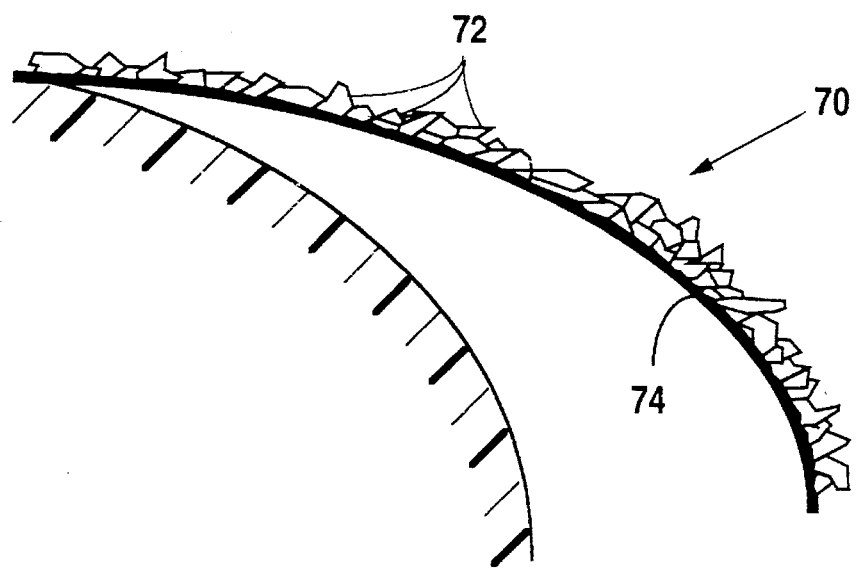
FIG. 6 is a sectional view depicting the use of a fusion bonding method of applying the abrasive layer to a closure/conduit.

Two additional methods of applying the abrasive material to the closure are shown in FIGS. 5 and 6. FIG. 5 represents fabrication of a closure (having a wall 60) in a mold 62. The abrasive material 64 is interposed between the outer surface of wall 60 (i.e., the outer surface of the parison) and the inner surface 66 of mold 62. In this manner, the application of the abrasive material is combined with the molding process to simplify fabrication of the closure. Both granules and the abrasive mesh may be so applied to the closure. Also, the granules may be coated, with either an adhesive or a polymer having a higher melting temperature than the melting temperature of the closure wall, to protect inner surface 66 of mold 68 from the abrasive material. The granules may optionally be supported on a layer of heat-activated adhesive with an appropriate carrier.

FIG. 6 illustrates the use of a strip 70 having abrasive material 72 applied thereto, the strip being formed of a composite bonding matrix (CBM) 74 adapted for fusion bonding. For example, CBM 74 may be primarily polyethylene having a plurality of susceptor particles suspended therein which absorb microwave energy to heat CBM 74 past its melting point; see U.S. Pat. No. 5,245,151. Thus, when strip 70 is placed against the wall 76 of a closure, and so heated, it fuses with the wall. Other fusion techniques (RF, induction and dieletric heating) could be used instead of microwave heating. This technique is particularly useful in the retrofit of existing closures and conduits.

In each of the foregoing embodiments, the abrasive layer results in a grating effect when the rodent's teeth scrape it. Thus, in addition to providing impact resistance, the abrasive material has such a harsh, unpleasant feel that it quickly deters the animal from attacking the article at all. In order to provide the protection of a physical barrier, it is necessary that the abrasive material be sufficiently hard to resist the initial animal attack. Some minerals having a hardness of as little as 3.0 Mohs may be adequate for this purpose, but a hardness of 5.0 Mohs is preferred. These hardness values are the same in both the original Mohs scale (1–10) and the modified Mohs scale (1–15). The hardness of the roofing granules used in the embodiment of FIGS. 5 and 6 is about 5.5–6.0 Mohs. The aluminum oxide coated on the Wet or Dry abrasive fabric has a hardness of about 9.0 Mohs.

In addition to its hardness, the abrasive material must also be rough or coarse. The abrasive layer should have an effective grit value of no more than 325, and preferably no more than 100. The Wet or Dry fabric has a grit value of about 80. If granules are used they are also preferably rough, i.e., irregular in shape, but they could be individually smooth, e.g., spherical ceramic or glass beads, as long as they are applied in such a manner as to impart an overall rough or bumpy profile to create an abrasive surface or layer. Different grit values may be used based upon the type of animal encountered in the specific geographical region in which the article is to be used, e.g., larger grits for groundhogs and smaller grits for gophers. The abrasive material may be selectively applied in varying thicknesses along the closure or cable wall based on known chewing/pecking patterns of the animals. Similarly, the abrasive material need not be applied to the entire outer surface of the closure/conduit, i.e., selective application includes zero thickness at some locations. The placement of the abrasive mesh as shown in FIG. 3 corresponds to those areas found to commonly be attacked by woodpeckers. The specific locations are (i) along the edge of the end face of the closure, (ii) along the longitudinal opening seam, and (iii) along the bottom portion of the closure for its full length (woodpeckers will hang from the drain ports and peck at the underside of the closure). In buried closure applications, the abrasive material is preferably applied at least at those areas having a relatively small radius compared to the jaw angle of the rodents. The abrasive layer could also be overcoated, e.g., to hide its presence, and thus the abrasive layer need not be the outermost layer of the closure/conduit. If granules are used, as opposed to the mesh which has small openings, then the abrasive layer may also present an effective barrier against insects, such as termites. Of course, animal repellents could still be applied over the abrasive layer, such as the tacky repellent described in U.S. Pat. No. 3,595,692.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, closure designs other than aerial or buried closures (e.g., pedestal and dome closures) may also benefit from this concept. Field application of the abrasive material may also be acheived using a vinyl or rubber tape having the abrasive material coated on one side of the tape. There are also many other methods of applying the abrasive material, such as clamping a barrier shield onto the closure/conduit, the shield supporting the abrasive material. It is therefore contemplated that such modifications can be made without departing from the spirit or scope of the present invention as defined in the appended claims.

We claim:

1. An article for providing environmental protection to a cable splice, the article comprising:

a body member having a hollow inner portion, a wall, and at least one cable entrance providing access to said inner portion;

means for sealing said cable entrance; and a layer of abrasive material applied to a portion of said wall of said body member, said layer of abrasive material having a hardness of at least 3.0 Mohs and a thickness of at least 50 microns, and including a mesh substrate having a coating of said abrasive material, said mesh substrate having a maximum spacing of four square centimeters.

2. The article of claim 1 wherein:

said portion of said wall is formed of a thermoplastic, polymeric material; and said abrasive material is at least partially embedded in said wall.

3. The article of claim 1 wherein said abrasive material is affixed to an outer surface of said wall with an adhesive.

4. The article of claim 1 wherein said layer of abrasive material has a grit value of at most 325.

5. A cable splice closure comprising:

an elongate, generally tubular body having a hollow inner portion adapted to receive a section of cable, a wall formed of a thermoplastic polymeric material, and first and second ends;

means providing an opening to said inner portion of said body;

means for sealing said opening;

first and second cap members adapted to seal said first and second ends of said body, respectively; and a layer of non-metallic, abrasive material applied to a portion of said wall of said body, said layer of abrasive material having a hardness of at least 5.0 Mohs, a grit value of at most 325 and a thickness of at least 50 microns, and including a mesh substrate having a coating of said abrasive material, said mesh substrate having a maximum spacing of four square centimeters, and being attached to said wall by a portion of said thermoplastic material which has been heated and pressed through a portion of said mesh substrate.

6. The cable splice closure of claim 5 wherein:

said layer of abrasive material comprises a plurality of coarse granules embedded in said wall of said body member.

7. The cable splice closure of claim 5 wherein said layer of abrasive material comprises a plurality of coarse granules affixed to an outer surface of said wall with an adhesive.

8. An animal-resistant conduit comprising:

a body member having a hollow inner portion, a wall formed of a thermoplastic polymer, and at least two entrances; and a layer of non-metallic, abrasive material formed on a portion of said wall of said body member, said layer of abrasive material having a hardness of at least 3.0 Mohs and a thickness of at least 50 microns a mesh substrate having a coating of said abrasive material, said mesh substrate having a maximum spacing of four square centimeters, and being attached to said wall by a portion of said thermoplastic polymer which has been heated and pressed through a portion of said mesh substrate.

9. The conduit of claim 8 wherein:

said layer of abrasive material comprises a plurality of coarse granules embedded in said wall of said body member.

10. The conduit of claim 8 wherein said layer of abrasive material comprises a plurality of coarse granules affixed to an outer surface of said wall with an adhesive.

* * * * *